United States Patent [19]
Sircy

[11] Patent Number: 5,517,723
[45] Date of Patent: May 21, 1996

[54] HINGE PIN WITH INSERTION TOOL

[76] Inventor: Patricia M. Sircy, 2152 Bohon Rd., Harrodsburg, Ky. 40330

[21] Appl. No.: 308,418

[22] Filed: Sep. 19, 1994

[51] Int. Cl.$^6$ .................................................. G02C 5/22
[52] U.S. Cl. ............................................................ 16/228
[58] Field of Search ............................ 16/228, 229, 386, 16/261, 262, 263, 268; 351/121, 140, 153

[56] References Cited

U.S. PATENT DOCUMENTS

| | | | |
|---|---|---|---|
| 2,947,024 | 8/1960 | Czudak, Jr. | 16/228 |
| 3,403,958 | 10/1968 | Gross | 16/228 |
| 4,847,950 | 7/1989 | Coleman | 16/386 |
| 4,987,639 | 1/1991 | Baiuley et al. | 16/386 |

FOREIGN PATENT DOCUMENTS 133021  5/1989  Japan ........................................ 16/228

*Primary Examiner*—Daniel W. Howell
*Assistant Examiner*—Chuck Y. Mah
*Attorney, Agent, or Firm*—Charles J. Brown

[57] ABSTRACT

For an eyeglass hinge having a pin-receiving bore formed in intermeshed pivotable lug sets, a hinge pin with longitudinal tabs on that end of the pin first inserted in the bore which are squeezed together to pass through the bore and which spring resiliently apart after insertion so that detents on the respective tab extremities hold the pin in place while permitting ready withdrawal by again squeezing the tabs together, and a manipulable insertion tool removably attached to a head of the pin to be broken away after insertion.

7 Claims, 2 Drawing Sheets

HINGE PIN WITH INSERTION TOOL

BACKGROUND OF THE INVENTION

Eyeglasses include small hinges between the lens frame and the foldable temple side elements. Such hinges have a pair of intermeshed pivotable lug sets which define a pin-receiving bore with bore ends opening onto opposed lug set faces. An end lug of one set is typically formed with internal threads. A removable hinge pin with a head at one end and external threads at its other end is inserted threaded end first into the hinge bore opposite the threaded lug, and the threaded end of the pin screws into the threaded lug as the head comes into restraining engagement with the uppermost lug set face.

Small screw-type hinge pins of this conventional design often loosen and even inadvertently come out entirely. They are then frequently lost and, because of their minute size, replacement is an extremely difficult procedure.

It is the principal purpose of the present invention to provide an improved hinge pin with three major design features. First, it is to require no retrofit modification of conventional hinge lugs. Second, it is to be readily removable. Third, it is to be easily insertable by means of an attached break-away insertion tool which can be separated after insertion without leaving unwanted and unnecessary stub parts on the pin.

Several prior art designs have been advanced for eyeglass hinge pins which depart from the common threaded design but which have the disadvantage of requiring substantial special modifications to the lugs of the hinge. Representative of such prior art are U.S. Pat. Nos. 3,594,073, 3,449,430 and 3,110,057. Not only do those designs require retrofit modifications but they are not combined with any form of attached manipulable break-away insertion tool.

Perhaps the closest prior art reference to the objects of the invention enumerated above is U.S. Pat. No. 3,826,565. It does not require retrofit modification of the hinge lugs and it does disclose an attached break-away tool to assist in insertion of the hinge pin. In that design a hinge pin is pulled downwardly through the hinge bore by means of a gripable tool body which is first inserted through the hinge bore and which is attached to that end of the pin remote from its head. This tool body includes a single side barb which together with the tool body itself is slightly oversized in relation to the hinge bore and must therefore undergo some resilient compression as it is pulled through the bore. When it emerges from the bore it then projects a slight extent to one side over the lowermost lug set face. The tool body is then cut off below the barb leaving the pin in place in the bore with removal prevented by the side barb. An unnecessary stub of the tool is left on the pin beyond the barb. There is no teaching in that reference whether or how the pin might be removed and indeed it is apparently not removable because it would be difficult if not impossible to squeeze the barb inwardly and push it on its way back through the bore. The non-removable nature of that pin is also indicated by the fact that the barb is faired on its lower side to slide along the bore during insertion but is sharply cut off on its upper locking side in a manner inconsistent with sliding travel back through the bore.

The hinge pin and installation tool in accordance with the present invention as described herein is distinguishable from the foregoing prior art in that it avoids any retrofit modifications to conventional hinge lugs, and is readily removable whenever desired, and is associated with a break-away manipulable insertion tool making assembly and disassembly quite easy without leaving unwanted stubs on the pin.

SUMMARY OF THE INVENTION

The removable hinge pin of the invention is intended for use with a hinge having a pair of intermeshed pivotable lug sets defining a pin-receiving bore with first and second bore ends opening onto opposed first and second lug set faces. The pin comprises a shank having leading and trailing portions slidably insertable into the bore through the first bore end leading portion first. On the end of the shank trailing portion is a head which is sized to prevent passage into the first bore end. In the shank leading portion there is a pair of resilient longitudinal elongated substantially parallel tabs divided by a longitudinal open-ended slot. A pair of radially outwardly extending detents on the respective tab extremities are extendable out of the second bore end when the head is restrained at the first bore end. These detents are sized to pass through the bore when the tabs are squeezed together and to spring resiliently apart when they emerge from the second bore end to project onto the second lug set face and prevent withdrawal of the pin. The pin is removable by squeezing the detents and tabs together and pushing the shank out of the bore in a direction opposite that of insertion.

In a preferred form the detents are arcuate projections each adapted to overlie the second lug set face around less than half the circumference of the second bore opening. The hinge pin of the invention is particularly suitable for use in a hinge for eyeglasses and is preferably in combination with a manipulable elongated insertion tool. This tool may have a body which is of a lateral cross section other than circular and which is substantially larger than the pin. Extending from the body is a tip integrally attached to the head of the pin and breakable therefrom after insertion of the pin in the hinge bore. The elongated body and attached pin may be substantially coaxial. A push rod may project from the body and be sized to fit into the hinge bore for pushing out the pin during removal of the pin from the hinge, and the push rod may extend coaxially from the body opposite the attached pin.

DESCRIPTION OF PREFERRED EMBODIMENT

Figure 1:
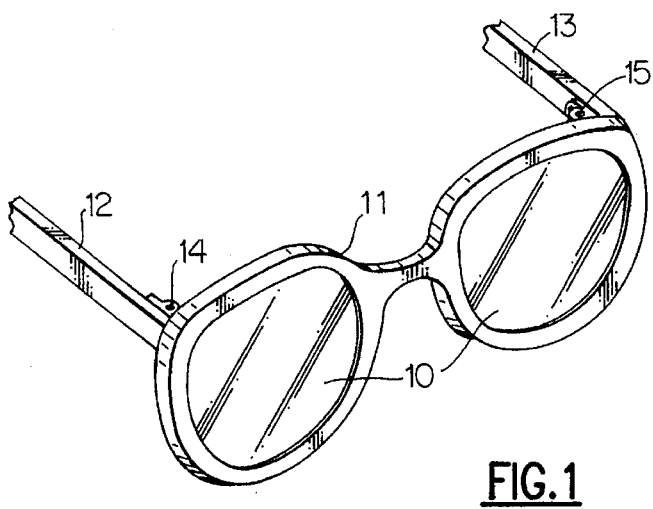
FIG. 1 is a fragmentary pictorial view of typical eyeglasses showing a lens frame attached to foldable temple elements by small hinges.
Figure 2:
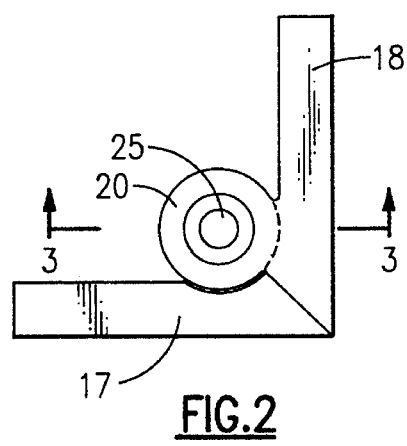
FIG. 2 is a plan view of one of the hinges shown in FIG. 1 with the hinge pin removed.
Figure 3:
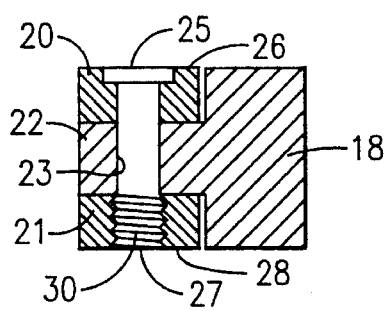
FIG. 3 is a section taken along the line 3—3 of FIG. 2 illustrating a simple form of intermeshed pivotable lug sets.

Referring first to FIG. 1, conventional eyeglasses are illustrated comprising a pair of lenses 10 mounted in a lens frame 11. Foldable temple elements 12 and 13 are pivotally connected to the ends of the lens frame 11 by small hinges 14 and 15. In FIGS. 2 and 3 certain components of the hinge 15 are shown in more detail. They include a first hinge plate 17 fastened by any suitable means such as rivets to one end of the lens frame 11 and a second hinge plate 18 similarly fastened to one end of the temple element 13. A first lug set consisting of lugs 20 and 21 extends integrally from the first hinge plate 17. This first lug set intermeshes with a second lug set consisting of a single lug 22 extending integrally from the hinge plate 18.

The three lugs 20, 21 and 22 together define a pin-receiving bore 23 formed by holes of the same diameter in the respective lugs which are aligned when assembled. The pin-receiving bore 23 has a counterbored first bore end 25 opening onto a first lug set face 26 and a second bore end 27 opening onto a second lug set face 28 opposite the first lug set face 26. The lug 21 of the first lug set defines the second lug set face 28 and it is typically formed with internal threads 30 for threaded engagement with a conventional hinge pin threaded on one end opposite a head which fits within the counterbored first bore end 25.

It will be understood that lug sets comprising more individual lugs than those shown in FIGS. 2 and 3 are quite common in conventional eyeglass hinges, as will be seen from the prior art patents identified hereinbefore. Often two or three or even more lugs constitute each set to intermesh with their counterparts of the other set. The improvement of the present invention is applicable to simple lug sets such as those shown in FIGS. 2 and 3 as well as to the more complex multiple-lug sets of the prior art.

All the elements of a conventional pair of eyeglasses so far described, including the components of the hinges consisting of the hinge plates and lug sets, need not in any way be modified to receive the improved hinge pin of this invention. As will become clear, the internal threads 30 in the lug 21 are not utilized by the hinge pin of the invention but neither does their presence interfere with the design and function of the improved hinge pin.

Figure 4:
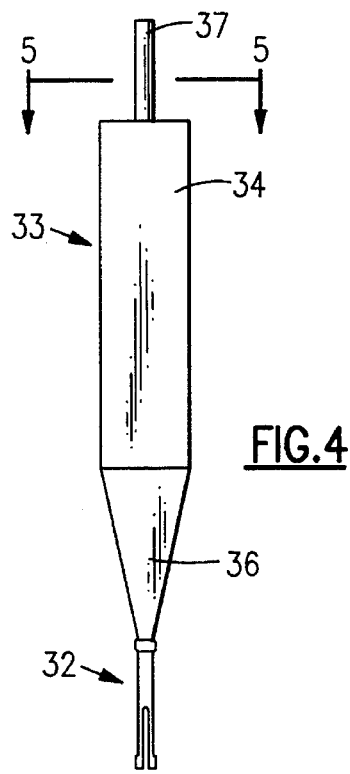
FIG. 4 is a side elevation of the hinge pin and associated tool of the invention.
Figure 5:
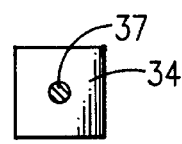
FIG. 5 is a section taken along the line 5—5 of FIG. 4 showing the lateral cross section of the tool push rod and of the non-circular tool body.

The removable hinge pin installation device of the invention is shown over-all in FIGS. 4 and 5. It consists of a specially designed pin 32 and removably attached to a manipulable elongated insertion tool 33. The insertion tool 33 includes a body 34 which is substantially larger than the pin 32 so that it can be easily grasped by hand and manipulated during insertion or removal of the pin. Its lateral cross section shown in FIG. 5 is non-circular, and specifically in this embodiment is squared, so that it will not roll on a flat working surface. Included in the body 34 of the tool 33 is an integral tip portion 36. If the body 34 is of square cross section, as here, the tip portion 36 would be of four-sided pyramidal shape. It narrows down to a tip end which is integrally attached to the pin 32 as described hereinafter.

Preferably the tip 36 is arranged coaxially with respect to the pin 32 and is easily breakable from the pin after insertion of the pin in the hinge bore simply by rocking the tool 33 back and forth so that the pin and tool snap apart without leaving any unnecessary stub portion remaining on the pin.

At the opposite end of the tool body 34 is a push rod 37 of circular cross section as shown in FIG. 5. The push road is preferably coaxial with the tool body 34 and the pin 32. The diameter of the push rod 37 is slightly less than the diameter of the hinge bore 23 so that the rod 37 can be used for pushing out the pin 32 during removal of the pin from the hinge.

The material chosen for the combined pin 32 and tool 33 may vary greatly but it must be such that snapping apart of the pin and tool is easily achieved. Also, as will be apparent from the following description, the material for the pin must possess a certain resilience so that its parts can be deformed elastically without exceeding the yield point of the material. Nylon is a particularly suitable material to meet these requirements, though other plastics and various metals may serve as well.

Figure 6:
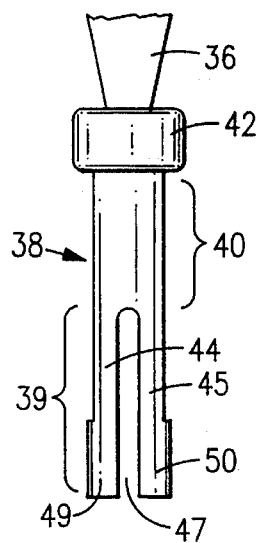
FIG. 6 is an enlarged fragmentary side view of the pin of the invention attached to the tip of the tool with the pin shank tabs in their nominal spread position.

In FIG. 6 the hinge pin 32 is shown in more detail. It includes a substantially cylindrical shank 38 having a leading portion 39 and a trailing portion 40. A head 42 is included on the end of the shank trailing portion 40 and it is sized to fit within the counterbore of the first bore end 25 and is thus prevented from further passage into the bore 23. The extremity of the tip 36 of the tool 33 is integrally attached coaxially to a confined central portion of the top face of the head 42, and it is at that point of attachment that the tip 36 and pin 32 are broken apart without leaving any substantial stub portion on the pin 32.

Figure 7:
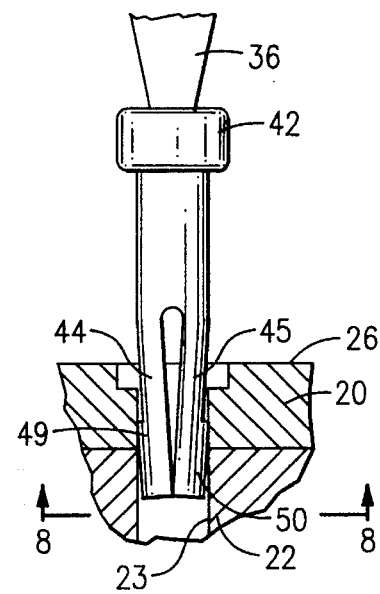
FIG. 7 is a view of the pin with the tabs squeezed together in the first stage of insertion through the hinge bore with the hinge lug sections shown in fragmentary section.
Figure 9:
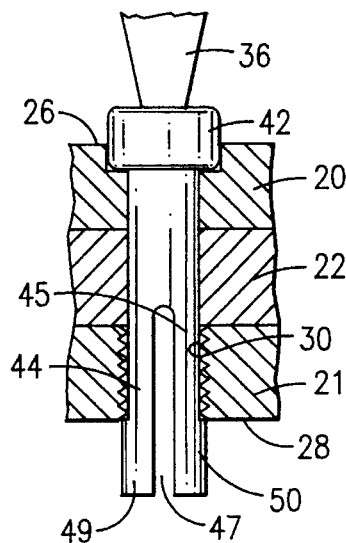
FIG. 9 is a view somewhat similar to FIG. 7 showing the pin fully inserted through the bore with the detents sprung apart to prevent withdrawal of the pin.
Figure 8:
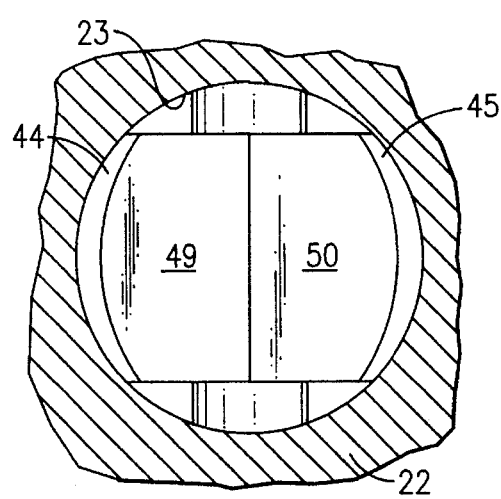
FIG. 8 is an enlarged lateral section taken along the line 8—8 of FIG. 7 showing the end of the leading portion of the shank of the pin with the detents squeezed together and the slot closed between the tabs.
Figure 10:
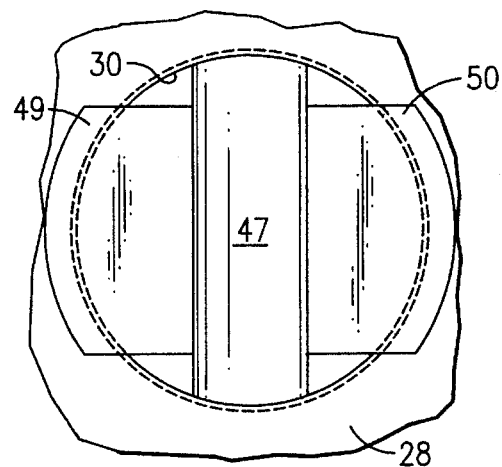
FIG. 10 is an enlarged fragmentary end view similar to FIG. 8 showing the detents sprung apart with the slot open between the tabs.

The diameter of the trailing portion 40 of the shank 38 is continued along the leading portion 39 as well, and it is slightly less than the diameter of the hinge bore 23 so that those portions of the pin 32 can slide readily within the bore. The leading portion 39 of the pin 32 includes a pair of resilient longitudinal elongated tabs 44 and 45. Prior to insertion these tabs 44 and 45 in their rest position are divided by a longitudinal open-ended slot 47. On the respective extremities of the tabs 44 and 45 are a pair of radially outwardly extending detents 49 and 50. The length of the pin 32 is such that when the head 42 is seated in the counterbore at the first bore end 25 of the bore 23 the detents 49 and 50 extend out of the second bore end 27 as shown in FIG. 9. As is apparent from FIG. 10 these detents 49 and 50 are arcuate projections each adapted to overlie the second lug set face 28 around less than half the circumference of the second bore opening 27. Together, however, the combined arcs of the two detents 49 and 50 overlie substantially more than half that circumference. Even though the detents 49 and 50 extend radially outwardly from the respective tabs 44 and 45, they are sized to pass through the bore 23 when the tabs 44 and 45 are squeezed together as shown in FIGS. 7 and 8. When the detents 49 and 50 emerge from the second bore end 27 they project onto the second lug set face 28 as shown in FIGS. 9 and 10 in opposite directions over more than half the bore circumference to prevent withdrawal of the pin 32.

In the operation of the hinge pin installation device of the invention the first and second lug sets comprising lugs 20, 21 and 22 are intermeshed to define the bore 23. The tool body 34 is then grasped by hand and its attached pin 32 is directed downwardly into the first bore end 25. The tabs 44 and 45 are then squeezed resiliently together from the open position shown in FIG. 6 to the closed position shown in FIG. 7, perhaps with the aid of tweezers, to permit the leading end portion 39 of the pin 32 to enter downwardly into the bore 23. This downward translation of the pin 32 is continued until the head 42 is seated the counterbore of the first bore end 25 and can go no further. At this point the detents 49 and 50 have cleared the second end 27 of the bore 23 and hence they spring apart to the position shown in FIGS. 9 and 10.

The arcuate detents 49 and 50 then overlie opposite and rather extensive areas of the second lug set face 28 and prevent removal of the pin. The tool 33 is then rocked manually back and forth until by virtue of fatigue stress the tip 36 snaps cleanly away from the head 42 of the pin 32.

The removal process is simply the reverse of these steps. The exposed detents 49 and 50 are squeezed together, again perhaps with the use of tweezers, and the pin 32 is pushed out of the bore 23 in a direction opposite that of insertion. The undersized push road 37 can be utilized for that purpose.

It will be recognized that during insertion and removal the presence of the conventional threads 30 in the lug 21 does not in any way interfere with the operation of the hinge pin of the invention. No modification of any kind is required on any parts of the conventional eyeglass hinges shown in FIGS. 1, 2 and 3 to utilize the hinge pin of the invention. Removal as well as insertion is a simple process with the associated break-away insertion tool 33 leaving no unwanted stub on the inserted pin.

The scope of the invention is to be determined by the following claims rather than the foregoing description of a preferred embodiment.

I claim:

1. For use with a hinge for eyeglasses having a pair of intermeshed pivotable lug sets defining a pin-receiving bore with first and second bore ends opening onto opposed first and second lug set faces, a removable hinge pin and installation device therefor comprising
    a) a shank having leading and trailing portions slidably insertable into the bore with said leading portion of the shank entering the bore first through the first bore end,
    b) a head on the end of the shank trailing portion sized to prevent passage into the first bore end,
    c) a pair of resilient longitudinal elongated substantially parallel tabs in the shank leading portion divided by a longitudinal open-ended slot,
    d) a pair of radially outwardly extending detents on the respective tab extremities extendable out of the second bore end when the head is restrained at the first bore end,
    e) said detents being sized to pass through the bore when the tabs are squeezed together and to spring resiliently apart when they emerge from the second bore end to project onto the second lug set face to prevent withdrawal of the pin,
    f) said pin being removable by squeezing the detents and tabs together and pushing the shank out of the bore in a direction opposite that of insertion, and
    g) a manipulable elongated insertion tool having a body substantially larger than the pin and a tip integrally attached to the head of the pin and breakable therefrom after insertion of the pin in said bore.

2. A hinge pin according to claim 1 wherein the detents are arcuate projections each adapted to overlie the second lug set face around less than half the circumference of the second bore opening.

3. A hinge pin and installation device according to claim 1 wherein the elongated body is of a lateral cross section other than circular.

4. A hinge pin and installation device according to claim 1 wherein the elongated body and said pin are substantially coaxial.

5. A hinge pin and installation device according to claim 1 wherein a push rod projects from said body and is sized to fit into the hinge bore for pushing out the pin during removal of the pin from the hinge.

6. A hinge pin and installation device according to claim 5 wherein the push rod extends coaxially from the body opposite said pin.

7. For use with a hinge for eyeglasses having a pair of intermeshed pivotable lug sets defining a pin-receiving bore with first and second bore ends opening onto opposed first and second lug set faces, a removable hinge pin installation device comprising
    a) a hinge pin comprising
        i. a shank having leading and trailing portions slidably insertable into the bore with said leading portion of the shank entering the bore first through the first bore end,
        ii. a head on the end of the shank trailing portion sized to prevent passage into the first bore end,
        iii. a pair of resilient longitudinal elongated substantially parallel tabs in the shank leading portion divided by a longitudinal open-ended slot, and
        iv. a pair of radially outwardly extending detents on the respective tab extremities extendable out of the second bore end when the head is restrained at the first bore end,
        v. said detents being arcuate projections each adapted to overlie the second lug set face around less than half the circumference of the second bore opening,
        vi. said detents being sized to pass through the bore when the tabs are squeezed together and to spring resiliently apart when they emerge from the second bore end to project onto the second lug set face to prevent withdrawal of the pin,
        vii. said pin being removable by squeezing the detents and tabs together and pushing the shank out of the bore in a direction opposite that of insertion; and
    b) a manipulable elongated insertion tool comprising
        i. a body substantially larger than the pin with a lateral cross section other than circular and having a tip integrally attached to the head of the pin with the body displaced substantially coaxial with the pin and breakable therefrom after insertion of the pin in the bore, and
        ii. a push rod projecting coaxially from the body opposite the attached pin and sized to fit into the hinge bore for pushing out the pin during removal of the pin from the hinge.

* * * * *